United States Patent
Huang et al.

(10) Patent No.: US 11,922,027 B2
(45) Date of Patent: Mar. 5, 2024

(54) MEMORY ACCESS SPEED ADJUSTMENT METHOD, CONTROL DEVICE AND MEMORY MODULE

(71) Applicant: INNODISK CORPORATION, New Taipei (TW)

(72) Inventors: Chung-Ting Huang, New Taipei (TW); Chung-Yi Lai, New Taipei (TW); Ting-Chiang Liu, New Taipei (TW)

(73) Assignee: INNODISK CORPORATION, New Taipei (TW)

( * ) Notice: Subject to any disclaimer, the term of this patent is extended or adjusted under 35 U.S.C. 154(b) by 210 days.

(21) Appl. No.: 17/715,980

(22) Filed: Apr. 8, 2022

(65) Prior Publication Data

US 2023/0236738 A1 Jul. 27, 2023

(30) Foreign Application Priority Data

Jan. 24, 2022 (TW) .................................. 111102931

(51) Int. Cl.
 *G06F 3/06* (2006.01)
(52) U.S. Cl.
 CPC .......... *G06F 3/0619* (2013.01); *G06F 3/0613* (2013.01); *G06F 3/0659* (2013.01); *G06F 3/0679* (2013.01)

(58) Field of Classification Search
 CPC .... G06F 3/0619; G06F 3/0613; G06F 3/0659; G06F 3/0679; G06F 3/061; G06F 3/0634; G06F 3/0653; Y02D 10/00; G11C 7/04; G11C 16/26
 See application file for complete search history.

(56) References Cited

U.S. PATENT DOCUMENTS

| | | | |
|---|---|---|---|
| 7,650,481 B2 * | 1/2010 | Walker | G06F 13/1689 365/194 |
| 2010/0023678 A1 * | 1/2010 | Nakanishi | G11C 16/102 327/512 |
| 2016/0239235 A1 * | 8/2016 | Chung | G11C 7/04 |
| 2020/0341847 A1 * | 10/2020 | Boehm | G11C 29/52 |
| 2023/0325310 A1 * | 10/2023 | Wang | G06F 1/3225 |

\* cited by examiner

*Primary Examiner* — Hiep T Nguyen

(57) ABSTRACT

A memory access speed adjustment method, control device and memory module are provided. The method is for use in controlling a controller of a memory and includes steps of: obtaining a current temperature value of the memory; determining an access speed threshold of the memory according to a continuous variation relation with respect to a difference between the current temperature value and a target temperature value; and adjusting, by the controller, an access speed of the memory according to the access speed threshold.

18 Claims, 4 Drawing Sheets

MEMORY ACCESS SPEED ADJUSTMENT METHOD, CONTROL DEVICE AND MEMORY MODULE

CROSS-REFERENCE TO RELATED APPLICATION

This non-provisional application claims priority under 35 U.S.C. § 119(a) on Patent Application No. 111102931 filed in Taiwan, R.O.C. on Jan. 24, 2022, the entire contents of which are hereby incorporated by reference.

BACKGROUND OF THE INVENTION

1. Field of the Invention

The present disclosure relates to a control technology for memory and, more particularly, to a memory access speed adjustment method, a control device and a memory module.

2. Description of the Related Art

Computing devices, such as network servers, personal computers or mobile devices, are vulnerable to high temperature caused by the heat generated by the operating environment or computing devices. Computing devices operating at high temperature for a long period of time are likely to incur hardware-related damage and data loss, not to mention shortened service life of their parts and components. To address the aforesaid issue, the industrial sector usually achieves cooling by using thermal throttling. For example, if the temperature of a central processing unit of a computing device is greater than a predetermined threshold, the operating frequency of the central processing unit will automatically be switched or reduced to a lower operating frequency directly in order to adjust their temperature, although at the cost of overall computation performance, thereby causing computation result delays.

Take multi-stage thermal throttling typical of storage devices, such as a solid-state drive (SSD), as an example. For instance, the thermal throttling takes place in three stages with threshold temperatures of 85° C., 95° C., 100° C., respectively. If the solid-state drive is overheated and reaches a temperature above 85° C., the host end will trigger the first-stage speed reduction (for example, reducing the operating frequency of the memory in the solid-state drive), and thus the temperature may be controlled effectively or continue to rise. If the temperature continues to rise to be above 95° C., the host end will trigger the second-stage speed reduction to reduce the speed further. If the temperature continues to rise to be above 100° C., the host end will trigger and perform the third-stage speed reduction until the solid-state drive restores to a safe operating temperature. During the process of operation of the aforesaid conventional multi-stage thermal throttling, the host triggers speed reduction for a stage according to whether the temperature exceeds the corresponding threshold of the stage, leading to deterioration of the solid-state drive's data access performance and the consequent stepwise switching of its data reading performance.

The aforesaid conventional multi-stage thermal throttling is effective in regulating the temperature of a storage device, although at the cost of user experience. For instance, if the solid-state drive carries out speed reduction between different stages in order to perform the aforesaid conventional multi-stage thermal throttling while the computing device, such as a network server, personal computer or mobile device, is reading video data in the solid-state drive, performing video data stream transmission, or processing and displaying video data, the data reading performance will undergo stepwise switching. As a result, the user end displays the video data with delays or stuttering effects.

Conventional data transmitted by networks or processed by computing devices not only include text data but also include video data. Immediacy requires large bandwidth for transmitting video data or processing and displaying video data with computing devices. Therefore, it is important to enhance the transmission performance of networks or the performance of computing devices in processing or accessing data.

BRIEF SUMMARY OF THE INVENTION

It is an objective of the present disclosure to provide a memory access speed adjustment technology and a controller for use in controlling memory and perform thermal throttling according to a continuous variation relation with respect to the difference between the current temperature value and target temperature value as well as an access speed threshold, so the thermal throttling thus performed is distinguished from the conventional multi-stage thermal throttling.

In order to achieve at least the above objective, the present disclosure provides a memory access speed adjustment method, for use in controlling a controller of a memory, comprising the steps of: obtaining a current temperature value of the memory; determining an access speed threshold of the memory according to a continuous variation relation with respect to a difference between the current temperature value and a target temperature value; and adjusting, by the controller, an access speed of the memory according to the access speed threshold.

In order to achieve at least the above objective, the present disclosure further provides a control device, for controlling an access speed of a memory, comprising: a controller and a memory device. The memory device stores executable code to be read and executed by the controller, so as to perform a plurality of operations comprising: obtaining a current temperature value of the memory; determining an access speed threshold of the memory according to a continuous variation relation with respect to a difference between the current temperature value and a target temperature value; and adjusting the access speed of the memory according to the access speed threshold.

In order to achieve at least the above objective, the present disclosure further provides a memory module comprising: a memory; a temperature sensor for sensing a current temperature value of the memory; a controller coupled to the memory and the temperature sensor and configured to control the memory; and a memory device for storing executable code to be read and executed by the controller, so as to perform a plurality of operations comprising: obtaining the current temperature value of the memory; determining an access speed threshold of the memory according to a continuous variation relation with respect to a difference between the current temperature value and a target temperature value; and adjusting the access speed of the memory according to the access speed threshold.

In some embodiments of the present disclosure, the operations (or the method) further comprise: determining that an absolute value of the difference between the current temperature value and the target temperature value is greater than or equal to an allowable temperature variation; wherein the operation (or the corresponding step) of determining the access speed threshold of the memory is performed in response to that the absolute value of the difference is greater than or equal to the allowable temperature variation.

In some embodiments of the present disclosure, the operations (or the method) further comprise: determining that the current temperature value is greater than or equal to a start temperature value; wherein the operation (or the corresponding step) of determining the access speed threshold of the memory is performed in response to that the current temperature value is greater than or equal to the start temperature value.

In some embodiments of the present disclosure, the operations (or the method) further comprise: determining that the current temperature value is greater than or equal to a start temperature value; and determining that an absolute value of the difference between the current temperature value and the target temperature value is greater than or equal to an allowable temperature variation; wherein the operation (or the corresponding step) of determining the access speed threshold of the memory is performed in response to that the current temperature value is greater than or equal to the start temperature value and that the absolute value of the difference is greater than or equal to the allowable temperature variation.

In some embodiments of the present disclosure, the operations (or the method) further comprise: determining that the current temperature value is greater than or equal to a start temperature value; determining that an absolute value of the difference between the current temperature value and the target temperature value is greater than or equal to an allowable temperature variation; and determining that the current temperature value falls within an operating temperature range; wherein the operation (or the corresponding step) of determining the access speed threshold of the memory is performed in response to that the current temperature value is greater than or equal to the start temperature value, that the absolute value of the difference is greater than or equal to the allowable temperature variation, and that the current temperature value falls within the operating temperature range.

In some embodiments of the present disclosure, the continuous variation relation is based on a linear function relation with respect to the difference between the current temperature value and the target temperature value.

In some embodiments of the control device or memory module, the continuous variation relation is based on a first linear function relation with respect to the difference between the current temperature value and the target temperature value and a second linear function relation with respect to another difference between the current temperature value and a previously measured temperature value.

In some embodiments of the present disclosure, the access speed takes place between the controller and the memory.

Therefore, the present disclosure provides embodiments of a memory access speed adjustment technology and a controller for use in controlling memory and performs thermal throttling according to a continuous variation relation with respect to the difference between the current temperature value and target temperature value as well as an access speed threshold, so as for the thermal throttling thus performed to be distinguished from the conventional multi-stage thermal throttling. With the technology being applied to a controller of a memory, the thermal throttling thus performed is conducive to steady variation of the corresponding access speed, appropriate adjustment of the access speed, and improvement of user experience at the user end, for example, reduction or prevention of delays or stuttering effects which may otherwise happen to video data displayed at the user end.

DETAILED DESCRIPTION OF THE INVENTION

Objectives, features, and advantages of the present disclosure are hereunder illustrated with specific embodiments, depicted with drawings, and described below.

Figure 1:
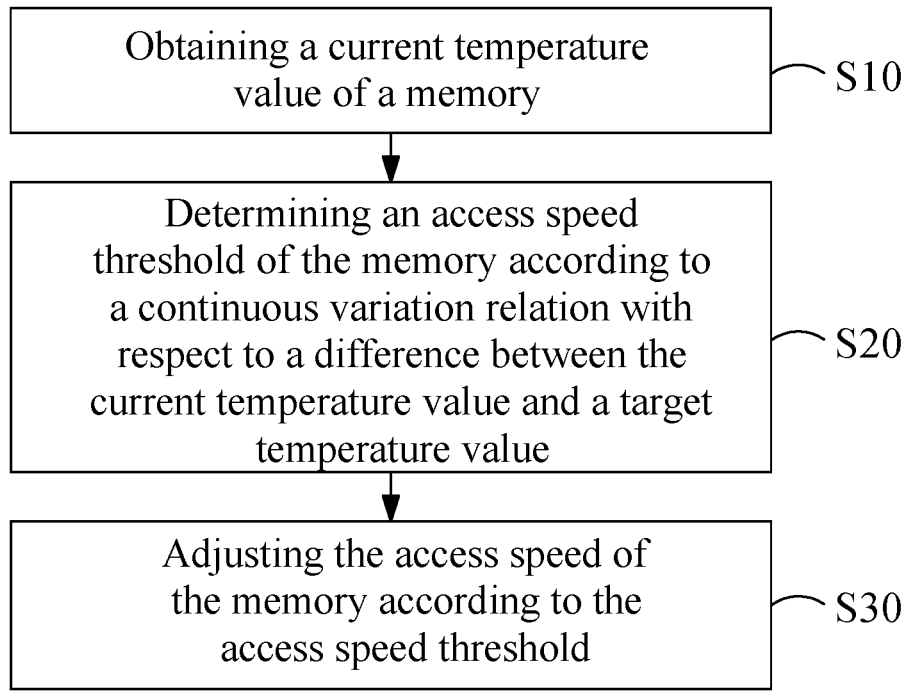
FIG. 1 is a schematic flowchart of a memory access speed adjustment method according to an embodiment of the present disclosure.
Figure 2:
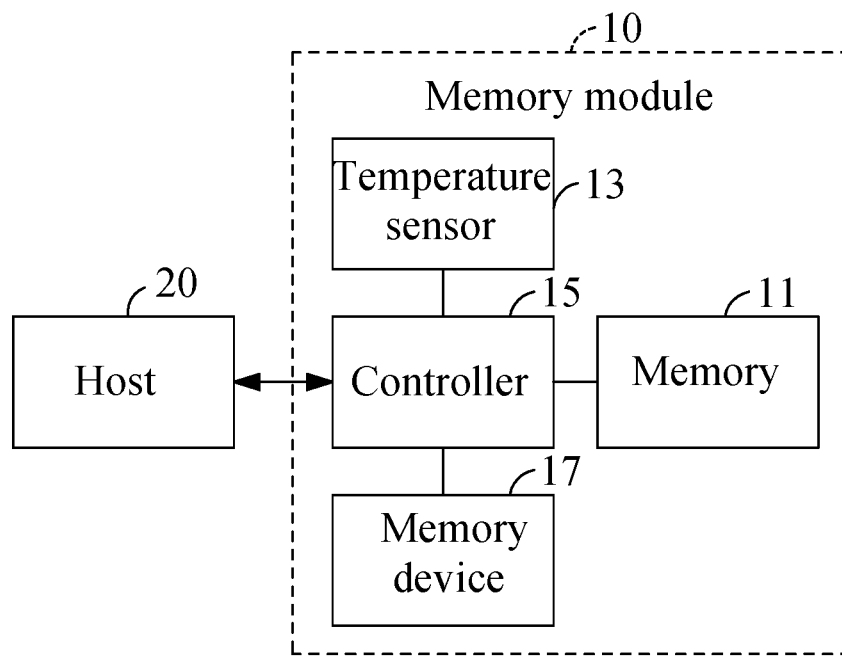
FIG. 2 is an architectural block diagram of a memory module according to an embodiment of the present disclosure.

Referring to FIG. 1, a memory access speed adjustment method is illustrated according to an embodiment of the present disclosure in a schematic flowchart. Referring to FIG. 2, a memory module 10 is illustrated according to an embodiment of the present disclosure in an architectural block diagram. The memory module 10 can be applied to implement the method illustrated by FIG. 1 or related embodiments to effectively regulate the temperature of a storage device whenever needed. The following examples with respect to FIG. 2 illustrate scenarios applicable to implementation according to the present disclosure. For instance, as shown in FIG. 2, a host 20 is a computing device, such as a server, smart device, tablet, laptop, or personal computer, and the memory module 10 is, for example, a built-in or external memory module of the host 20, or embedded storage or storage device, such as an SSD device. The memory module 10 of FIG. 2 receives data read or data write requests from the host 20 and thus performs access operations, for example, multiple host read requests issued by the host 20 to read data, such as video or multimedia data in the memory module 10. Referring to FIG. 2, the memory module 10 comprises a memory 11, a temperature sensor 13, a controller 15 and a memory device 17.

Referring to FIG. 1, in an embodiment, the memory access speed adjustment method comprises steps S10 to S30 described below. The method is for use in controlling a controller of a memory, for example, the controller 15 included in the memory module 10 and configured to control the memory 11. The method is hereunder described and exemplified by elements shown in FIG. 2 or any related diagram; however, the implementation of the method is not limited thereto. The embodiment of the method illustrated by FIG. 1 can represent various embodiments based on steps S10 to S30 are exemplified by.

As shown in step S10, a current temperature value of the memory is obtained. For instance, in the memory module 10, the controller 15 obtains the current temperature value of the memory 11 from the temperature sensor 13.

As shown in step S20, an access speed threshold of the memory is determined according to a continuous variation relation with respect to a difference between the current temperature value and a target temperature value. For instance, the controller 15 determines an access speed threshold (e.g., denoted by $V_{ioth}$) of the memory 11 according to a continuous variation relation with respect to a difference between the current temperature value (e.g., denoted by $T_{now}$) and the target temperature value (e.g., denoted by $T_{target}$).

As shown in step S30, the access speed of the memory is adjusted according to the access speed threshold by the controller. Specifically, the controller 15 limits the number of data accesses according to the access speed threshold $V_{ioth}$ so that an upper limit of the number of data accesses allowable per unit time is set to the access speed threshold $V_{ioth}$. If the upper limit of the number of data accesses decreases, the allowable memory access operations will decrease, and the corresponding temperature of the memory will gradually decrease and take the target temperature value $T_{target}$ as its target temperature. In this regard, the opposite is also true.

For instance, the controller 15 adjusts the access speed between the host 20 and the controller 15 according to the access speed threshold $V_{ioth}$ and thus adjusts the access speed of the memory 11. Alternatively, the controller 15 adjusts the access speed between the controller 15 and the memory 11 according to the access speed threshold $V_{ioth}$. Alternatively, the controller 15 simultaneously adjusts the access speed between the host 20 and the controller 15 as well as the access speed between the controller 15 and the memory 11. For example, the controller 15 adjusts the access speed of the memory 11 according to the access speed threshold $V_{ioth}$ by controlling a flow rate threshold of data access (for example, a threshold of data flow rate per unit time) according to the access speed threshold $V_{ioth}$, for example, managing the number of input/output instructions between the host 20 and the memory module 10 (for example, by the controller 15), or managing the number of input/output instructions between the controller 15 and the memory 11 according to the access speed threshold $V_{ioth}$, or simultaneously managing the number of input/output instructions between the host 20 and the memory module 10 (for example, by the controller 15) and the number of input/output instructions between the controller 15 and the memory 11.

The above method of FIG. 1 entails determining the access speed threshold $V_{ioth}$ according to a continuous variation relation with respect to the difference between the current temperature value and target temperature value and the access speed threshold to allow the controller to adjust the access speed of the memory according to the access speed threshold $V_{ioth}$ and thereby perform thermal throttling. Therefore, this technique is distinguished from the conventional multi-stage thermal throttling. The conventional multi-stage thermal throttling undergoes speed reduction between different stages, and data reading performance undergoes stepwise switching, to the detriment of user experience. The conventional multi-stage thermal throttling lacks the flexibility and mechanism otherwise required for addressing the aforesaid issue.

By contrast, a continuous variation relation with respect to the difference between the current temperature value and target temperature value as well as the access speed threshold can be utilized or designed appropriately to effectuate application of the method based on FIG. 1 to a controller of a memory to perform thermal throttling, so as to facilitate steady variation of the corresponding access speed. The continuous variation relation indicates a variation relation by which the corresponding access speed threshold increases or decreases according to variation of the difference, rather than the conventional multi-stage switching. According to the continuous variation relation, when the difference is a non-zero value, the variation of the access speed threshold is a corresponding non-zero value. By contrast, the variation relation corresponding to multi-stage switching is a step function, and there exists a numerical range with respect to the independent variable of the step function such that the variation of the dependent variable is zero when the independent variable varies. Therefore, the continuous variation relation utilized in step S20 is not a step function, and the step function can be a step function in one or more steps.

In implementation, for example, executable code for the method based on FIG. 1 is stored in the memory device 17 (such as RAM, ROM, EEPROM or firmware) of the memory module 10 illustrated by FIG. 2 so as to be executed by a controller to perform a plurality of operations for implementing the method based on FIG. 1.

In some embodiments, the continuous variation relation is based on a linear function relation with respect to the difference between the current temperature value and the target temperature value.

For instance, the access speed threshold is expressed by equation 1 below: $V_{ioth}=a_1(T_{target}-T_{now})+a_0$, where $V_{ioth}$ denotes an access speed threshold, $T_{now}$ denotes a current temperature value, $T_{target}$ denotes a target temperature value, $a_1, a_0$ denote control parameters, and $a_1$ is not equal to zero.

In another example, the access speed threshold is expressed by equation 2 below:

$$V_{ioth} = k_p \times \frac{T_{target} - T_{now}}{T_{target} - T_{start}} \times V_{max},$$

where denotations of $V_{ioth}$, $T_{now}$, $T_{target}$ are stated in the preceding paragraph, $T_{start}$ denotes a start temperature value, $k_p$ denotes a control parameter, $k_p$ is not equal to zero, and $V_{max}$ denotes a maximum access speed allowable for memory. Computation will be performed with equation 2 only if the current temperature value is greater than or equal to the start temperature value $T_{start}$.

In some embodiments, it is feasible to conduct an experiment and thereby plot a graph of steady temperature versus speed with respect to a memory or related electronic product, construct an equation by statistical regression analysis, and incorporate a constant or parameter into the target for a correctional purpose, so as to determine the aforesaid linear function relation.

With the aforesaid equation 1 or equation 2, the final access speed converges on in the vicinity of a steady value, and temperature ends up in the vicinity of the target temperature value $T_{target}$.

Furthermore, considering that the temperature variation speed affects the precision of the overall control system, temperature variation (denoted with $\Delta T$) can be incorporated into equation 1 or equation 2 to enhance the accuracy in system adjustment, where $\Delta T$ denotes the difference between the two temperatures measured in two instances of temperature measurement, respectively. The temperature variation $\Delta T$ is for use in controlling the temperature rising speed to augment thermal throttling, thereby mitigating the rise of temperature. Therefore, in some embodiments, the continuous variation relation is based on a first linear function relation with respect to the difference between the current temperature value and the target temperature value and a second linear function relation with respect to another difference between the current temperature value and a previously measured temperature value. For instance, the aforesaid equation 2 can be modified to equation 3 below:

$$V_{ioth} = k_p \times \frac{T_{target} - T_{now}}{T_{target} - T_{start}} \times V_{max} + k_i \times \Delta T,$$

where $k_i$ denotes a control parameter, $k_i$ is not equal to zero, and $\Delta T$ denotes temperature variation, for example, the difference between the current temperature value $T_{now}$ and a previously measured temperature value ($T_{prv}$).

Figure 3:
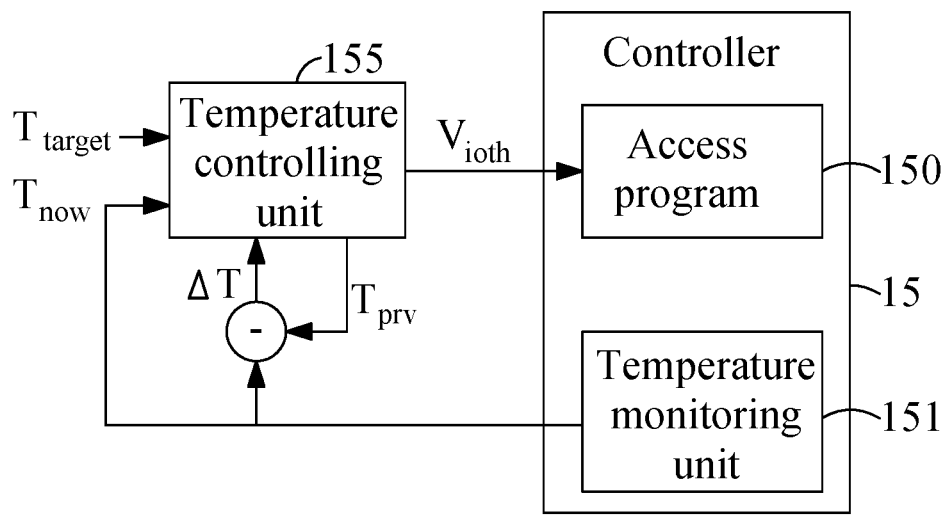
FIG. 3 is an architectural view of an embodiment according to the method of FIG. 1.

Referring to FIG. 3, an architectural view of an embodiment is shown according to the method of FIG. 1. In FIG. 3, the implementation of thermal throttling based on the method of FIG. 1 is illustrated by way of the controller 15 in the memory module 10 of FIG. 2. In this embodiment, the continuous variation relation used in step S20 is based on a first linear function relation with respect to the difference between the current temperature value and the target temperature value and a second linear function relation with respect to another difference between the current temperature value and a previously measured temperature value. As shown in FIG. 3, the controller 15 executes an access program 150 and a temperature monitoring unit 151. The access program 150 is for use in processing access operations of the memory 11 of the memory module 10, and the access speed of the access program 150 is restricted to the access speed threshold $V_{ioth}$. The temperature monitoring unit 151 is a program or circuit for use in processing the temperature monitoring of the memory module 10. The temperature monitoring unit 151 obtains the measured value of the temperature sensor 13 and uses it as the current temperature value $T_{now}$.

Furthermore, to perform the thermal throttling based on the method illustrated by FIG. 1, the embodiment illustrated by FIG. 3 further comprises a temperature controlling unit 155 for carrying out step S20 to thereby output the access speed threshold $V_{ioth}$. FIG. 3 schematically shows that the temperature controlling unit 155 receives the current temperature value $T_{now}$, target temperature value $T_{target}$ and temperature variation $\Delta T$ and attains the continuous variation relation with equation 3 to output the access speed threshold $V_{ioth}$. The temperature controlling unit 155 is configured to record the current temperature value $T_{now}$. As shown in FIG. 3, the temperature variation $\Delta T$ is the difference between the current temperature value $T_{now}$ and the previously measured temperature value $T_{prv}$ in order to compute the access speed threshold $V_{ioth}$ in the next instance of computation, wherein the previously recorded current temperature value $T_{now}$ is the previously measured temperature value $T_{prv}$. Furthermore, the temperature controlling unit 155 can be implemented by way of a circuit or program or by way of the controller 15. For example, the temperature controlling unit 155 can be implemented in the form of a program module or program code and executed by the controller 15.

Various ways of achieving memory access speed adjustment are illustrated with embodiments based on the method illustrated by FIG. 1.

Figure 4:
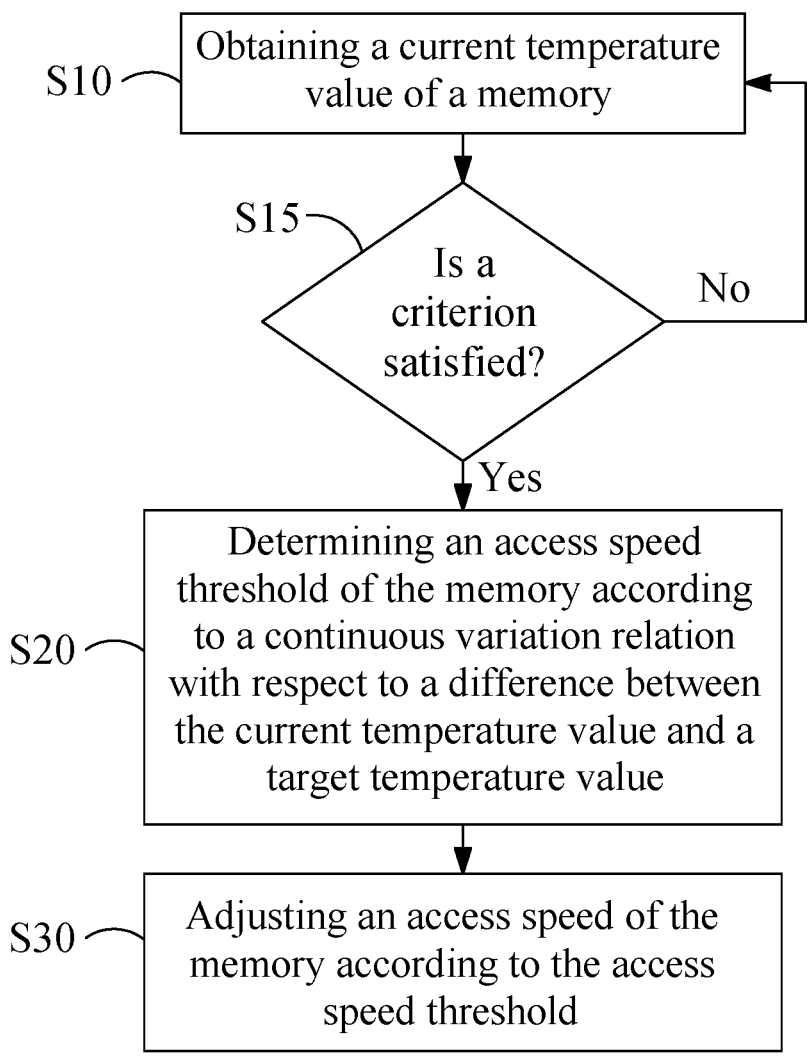
FIG. 4 is a schematic flowchart of an embodiment based on the method of FIG. 1.

In order to further enhance the implementation of the method illustrated by FIG. 1 with flexibility and improved performance of the thermal throttling, referring to FIG. 4, a schematic flowchart of an embodiment based on the method of FIG. 1 is illustrated. The embodiment illustrated with FIG. 4 not only includes steps S10 to S30 of FIG. 1 but also includes step S15. Step S15 involves confirming whether a specific criterion is satisfied. If the criterion is satisfied, step S20 and step S30 are performed. If the criterion is not satisfied, other operations will be performed, for example, repeating step S10 or other steps. Thus, to implement the method illustrated by FIG. 1, it is feasible to further devise appropriate criterion and adjust the time to perform step S20.

For example, the controller 15 performs temperature monitoring by dynamically obtaining an updated current temperature value (repeating step S10). When a criterion is (or more criteria are) satisfied (for example, as determined in step S15), the controller 15 determines the access speed threshold $V_{ioth}$ of the memory 11 (corresponding to step S20) in response to the criterion being satisfied and according to a continuous variation relation with respect to the difference between the current temperature value $T_{now}$ and target temperature value $T_{target}$, so as to ensure that the adjustment of the access speed threshold $V_{ioth}$ will take place only if the criterion is satisfied and preclude overly frequent adjustment.

Referring to FIG. 4, in some embodiments of the present disclosure, step S15 includes determining whether the current temperature value is greater than or equal to a start temperature value. Some embodiments based on the method illustrated by FIG. 1 comprises: determining that the current temperature value is greater than or equal to a start temperature value, wherein step S20 is performed in response to that the current temperature value is greater than or equal to the start temperature value. Step S20 will begin, only if the current temperature value is greater than or equal to the start temperature value $T_{start}$. For example, $T_{start}$ is less than $T_{target}$, and if $T_{target}$ is 100° C., $T_{start}$ can be set to 90° C., such that under general operation condition step S20 will not be performed frequently. However, the implementation of the present disclosure is not limited thereto.

Referring to FIG. 4, in some embodiments of the present disclosure, step S15 includes determining whether an absolute value of the difference between the current temperature value and the target temperature value is greater than or equal to an allowable temperature variation. Therefore, some embodiments based on the method illustrated by FIG. 1 comprises: determining that an absolute value of the difference between the current temperature value and the target temperature value is greater than or equal to an allowable temperature variation, wherein step S20 is performed in response to that the absolute value of the difference is greater than or equal to the allowable temperature variation. For instance, an allowable temperature variation Rs is set to 1° C., 1.5° C. or 2° C. Therefore, in the embodiments, the method illustrated by FIG. 1 precludes slight temperature variation (for example, ±1 to 2° C.) which might otherwise necessitate training anew, and thus the method is conducive to enhancement of the steadiness of convergence on the same access speed.

Referring to FIG. 4, in some embodiments of the present disclosure, step S15 may include determining whether the current temperature value falls within an operating temperature range.

Referring to FIG. 4, in some embodiments of the present disclosure, step S15 includes using different combinations of criteria. Some combinations of criteria are disclosed below for the sake of illustration. However, the implementation of the present disclosure is not limited thereto, and thus the criteria disclosed below can be increased or reduced in order to meet the design needs of memory-related electronic products.

For example, step S15 may include: determining whether the current temperature value is greater than or equal to a start temperature value; and determining whether an absolute value of the difference between the current temperature value and the target temperature value is greater than or equal to an allowable temperature variation. Therefore, some embodiments based on the method illustrated by FIG. 1 comprises: determining that the current temperature value is greater than or equal to a start temperature value; and determining that an absolute value of the difference between the current temperature value and the target temperature value is greater than or equal to an allowable temperature variation, wherein step S20 is performed in response to that the current temperature value is greater than or equal to the start temperature value and that the absolute value of the difference is greater than or equal to the allowable temperature variation.

For example, step S15 may include: determining whether the current temperature value is greater than or equal to a start temperature value; determining whether an absolute value of the difference between the current temperature value and the target temperature value is greater than or equal to an allowable temperature variation; and determining whether the current temperature value falls within an operating temperature range. Therefore, some embodiments based on the method illustrated by FIG. 1 comprise: determining that the current temperature value is greater than or equal to a start temperature value; determining that an absolute value of the difference between the current temperature value and the target temperature value is greater than or equal to an allowable temperature variation; and determining that the current temperature value falls within an operating temperature range, wherein step S20 is performed in response to that the current temperature value is greater than or equal to the start temperature value, that the absolute value of the difference is greater than or equal to the allowable temperature variation, and that the current temperature value falls within the operating temperature range.

Figure 5:
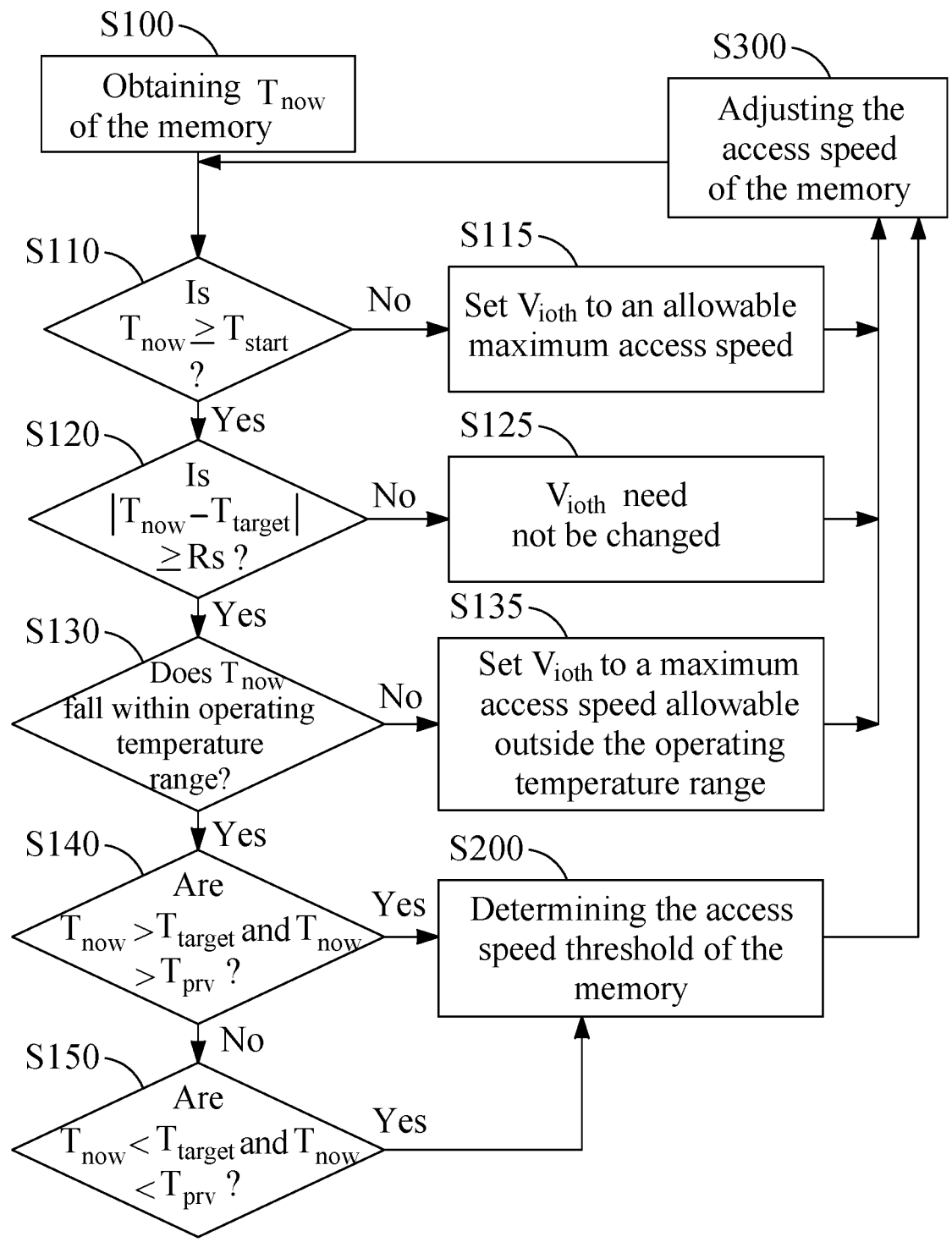
FIG. 5 is a schematic flowchart of an embodiment based on the method of FIG. 1.

Referring to FIG. 5, a schematic flowchart of an embodiment based on the method of FIG. 1 is illustrated.

As shown in step S100 (for example, based on step S10 of FIG. 1), a current temperature value of the memory is obtained. For instance, in the memory module 10, the controller 15 obtains the current temperature value of the memory 11 from the temperature sensor 13.

As shown in step S110, it is determined whether the current temperature value is greater than or equal to a start temperature value. If the current temperature value $T_{now}$ is greater than or equal to the start temperature value $T_{start}$, step S120 is performed. If the current temperature value $T_{now}$ is less than the start temperature value $T_{start}$, step S115 is performed. In step S115, the access speed threshold $V_{ioth}$ is set to an allowable maximum access speed, for example, an allowable maximum access speed normally applicable to the operation specification of the memory module 10. Furthermore, in step S115, the current temperature value is recorded and set to a previously measured temperature value $T_{prv}$. After that, for example, step S300 is performed, and then the temperature of the memory is monitored by way of steps S100, S110 and so on.

As shown in step S120, it is determined whether an absolute value of the difference between the current temperature value and the target temperature value is greater than or equal to an allowable temperature variation. If the absolute value of the difference is greater than or equal to the allowable temperature variation (e.g., denoted by Rs), step S130 is performed. If the absolute value of the difference is less than the allowable temperature variation, step S125 is performed. In step S125, the access speed threshold (e.g., denoted by $V_{ioth}$) need not be changed, but the current temperature value is recorded and set to the previously measured temperature value (e.g., denoted by $T_{prv}$). After that, for example, step S300 is performed, and then the temperature of the memory is monitored by way of steps S100, S110 and so on.

As shown in step S130, it is determined whether the current temperature value falls within an operating temperature range. For instance, regarding the operation specification of the memory module 10, the operating temperature range has a lower limit and an upper limit, such as −40° C. and 125° C. If the current temperature value falls within the operating temperature range, step S140 is performed. If the current temperature value does not fall within the operating temperature range, the process flow of the method will go to step S135. In step S135, the access speed threshold $V_{ioth}$ is set to a maximum access speed allowable outside the operating temperature range, which must be less than the maximum access speed normally allowed for the memory module 10. After that, for example, step S300 is performed, and then the temperature of the memory is monitored by way of steps S100, S110 and so on.

As shown in step S140, it is determined whether the current temperature value $T_{now}$ is greater than the target temperature value $T_{target}$ and whether the current temperature value $T_{now}$ is greater than the previously measured temperature value $T_{prv}$. If the determination result in step S140 is affirmative, it indicates that the measurement of the current temperature value $T_{now}$ is accurate and the access speed threshold $V_{ioth}$ needs to be reduced, and thus step S200 will be performed to calculate the new access speed threshold $V_{ioth}$. If the determination result in step S140 is negative, step S150 is performed.

As shown in step S150, it is determined whether the current temperature value $T_{now}$ is less than the target temperature value $T_{target}$ and whether the current temperature value $T_{now}$ is less than the previously measured temperature value $T_{prv}$. If the determination result in step S150 is affirmative, it indicates that the measurement of the current temperature value $T_{now}$ is accurate and the access speed threshold $V_{ioth}$ needs to be increased, and thus step S200 will be performed to calculate the new access speed threshold $V_{ioth}$. If the determination result in step S150 is negative, it indicates that the measurement of the current temperature value $T_{now}$ may be inaccurate or another situation has occurred, and thus optionally the other steps or operations will be performed, for example, and then the temperature of the memory is monitored by way of steps S100, S110 and so on.

As shown in step S200 (for example, based on step S20 of FIG. 1), the access speed threshold $V_{ioth}$ of the memory is determined according to a continuous variation relation with respect to the difference between the current temperature value and the target temperature value. For instance, the controller 15 determines the access speed threshold $V_{ioth}$ of the memory 11 according to a continuous variation relation with respect to the difference between the current temperature value $T_{now}$ and the target temperature value $T_{target}$. The continuous variation relation can be any one of the aforesaid equations 1 to 3 or any other appropriate continuous variation relation which is not a step function.

As shown in step S300 (for example, based on step S30 of FIG. 1), the access speed of the memory is adjusted according to the access speed threshold by the controller. For instance, the controller 15 limits number of data accesses according to the access speed threshold $V_{ioth}$ and thereby sets an upper limit of the allowable number of data accesses per unit time to the access speed threshold $V_{ioth}$.

Figure 6:
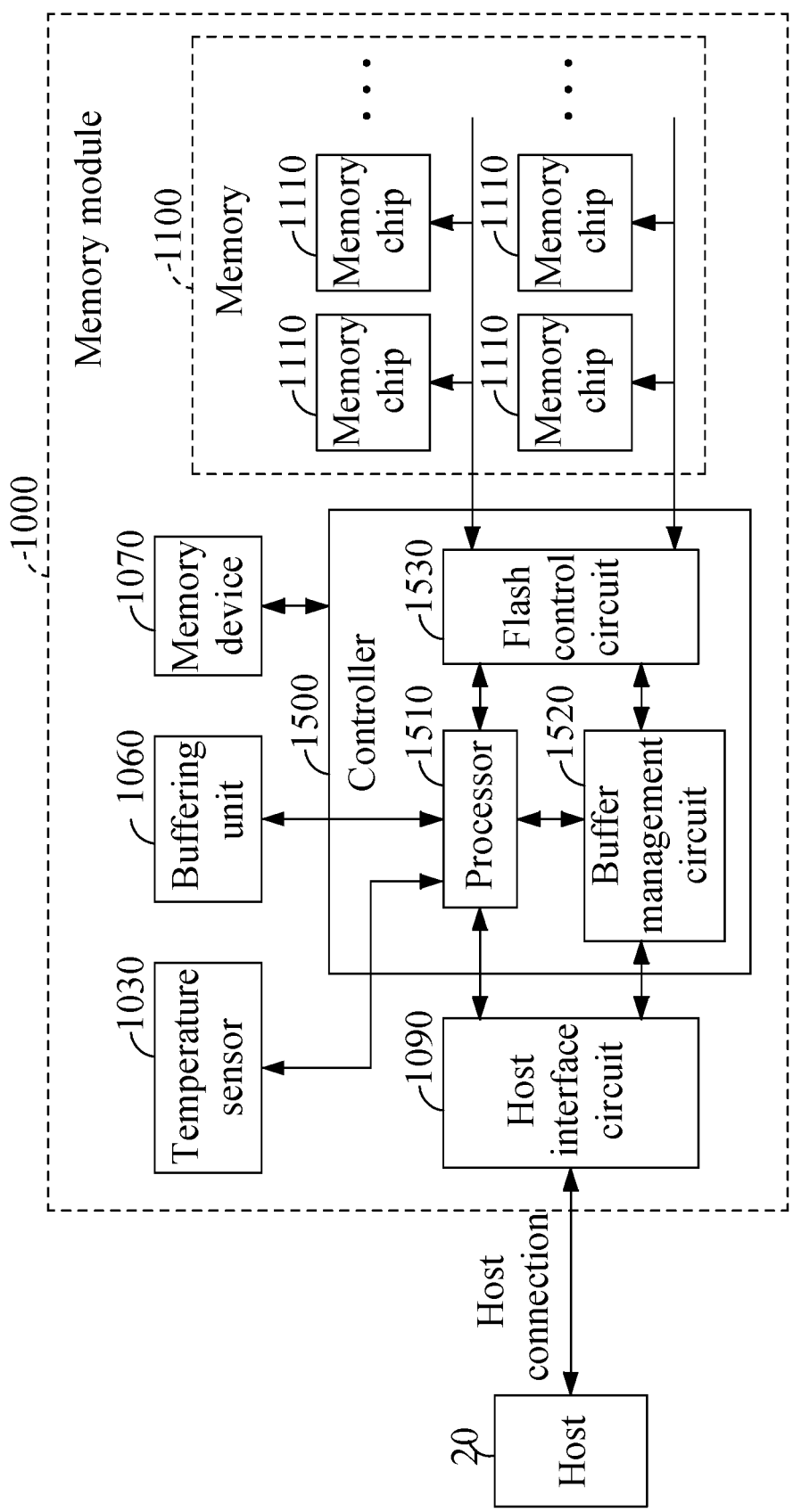
FIG. 6 is an architectural block diagram of the memory module according to an embodiment of the present disclosure.

Referring to FIG. 6, there is shown a block diagram of a memory module 1000 according to an embodiment of the present disclosure. The memory module 1000 is for implementing the method based on FIG. 1 or one of a combination of the aforesaid embodiments to thereby effectively regulate the temperature of a storage device whenever needed. The memory module 1000 is, for example, a memory module, or embedded storage or storage device, such as an SSD device. The memory module 1000 of FIG. 6 receives data read or data write requests from the host 20 and thus performs access operations, for example, a plurality of host read requests issued by the host 20 to read data, such as video or multimedia data in the memory module 10. Referring to FIG. 6, the memory module 1000 comprises a memory 1100, a temperature sensor 1030, a controller 1500 and a memory device 1070.

The memory 1100 comprises a plurality of memory chips 1110. For example, the memory chips 1110 are flash memory, such as NOR flash and NAND flash. However, the implementation of the present disclosure is not limited thereto.

The temperature sensor 1030 is, for example, a semiconductor component or thermosensitive electronic component capable of temperature sensing. The temperature sensor 1030 is disposed on the memory module 1000 and electrically coupled to the controller 1500. The temperature sensor 1030 senses the temperature of the memory module 1000 or the memory 1100 so as to send a sensing signal to the controller 1500.

The controller 1500 comprises a processor 1510, a flash control circuit 1530 and a buffer management circuit 1520.

The memory device 1070 is, for example, ROM or flash memory and is configured to store system firmware of the memory module 1000. To implement the memory device 1070, for example, executable code for the method illustrated by FIG. 1 is stored in the memory device 1070 (ROM or firmware) of the memory module 1000 of FIG. 6, and in consequence a controller executes the executable code to perform a plurality of operations for implementing the method based on FIG. 1.

The memory module 1000 further comprises a host interface circuit 1090 for use between the memory module 1000 and the host 20. Furthermore, the memory module 1000 further comprises a buffering unit 1060 provided, for example, in the form of random access memory (RAM).

The controller 1500 communicates with the host 20 through the host interface circuit 1090 to receive a read request or write request from the host 20. The controller 1500 generates a read command or write command corresponding to the host's read request or the host's write request and sends the read command or write command to the flash control circuit 1530. The flash control circuit 1530 controls at least one memory chip. For instance, the flash control circuit 1530 sends a data read command to a specific memory chip and sends data thus read to the controller 1500, allowing the data thus read to be temporarily stored in the buffering unit 1060 through the buffer management circuit 1520. The controller 1500 sends to the host 20 the data requested by the host 20. For instance, the flash control circuit 1530 writes intended data into the memory chip according to the data write command. When the controller 1500 controls operations of the memory 1100, the buffering unit 1060 stores data to be used by the controller 1500 and the memory 1100, for example, data for use in various operations such as read operations, write operations, programmed operations and erase operations. However, the implementation of the present disclosure is not limited thereto. For instance, the controller 1500 or the flash control circuit 1530 can be implemented by using a processor, logical circuit or programmable circuit.

The host interface circuit 1090 processes commands and data provided by the host 20 and communicates with the host 20 through at least one of the following interface protocols: Universal Serial Bus (USB), MultiMedia Card (MMC), Peripheral Component Interconnect Express (PCI-E), Serial Attached SCSI (SAS), Serial Advanced Technology Attachment (SATA), Parallel Advanced Technology Attachment (PATA), Small Computer System Interface (SCSI), Enhanced Small Disk Interface (ESDI), Integrated Drive Electronics (IDE), Advanced Host Controller Interface (AHCI), and Non-Volatile Memory express (NVMe).

The memory module 1000 is for implementing the method illustrated by FIG. 1 or implementing one or a combination of the aforesaid embodiments to thereby effectively regulate the temperature of a storage device whenever needed. For instance, the controller 1500 adjusts the access speed between the host 20 and the controller 1500, or adjusts the access speed between the controller 1500 and the memory 1100, or simultaneously adjusts the access speed between the host 20 and the controller 1500 and the access speed between the controller 1500 and the memory 1100, according to the access speed threshold $V_{ioth}$.

Furthermore, in the embodiments of the memory module, the controller (shown in FIG. 2, FIG. 3, FIG. 6) can be designed in accordance with a hardware description language (HDL), such as Verilog or any design method for digital circuits, which persons skilled in the art are familiar with, and implemented with at least one of related circuits, namely Field Programmable Gate Array (FPGA), Application Specific Integrated Circuit (ASIC), and Complex Programmable Logic Device (CPLD), or implemented with a dedicated circuit or module. The controller can also be implemented based on a microcontroller, processor, or digital signal processor.

Therefore, the present disclosure provides embodiments of a memory access speed adjustment technology and a controller for use in controlling memory and performs thermal throttling according to a continuous variation relation with respect to the difference between the current temperature value and target temperature value as well as an access speed threshold, so as for the thermal throttling thus performed to be distinguished from the conventional multi-stage thermal throttling. With the technology being applied to a controller of a memory, the thermal throttling thus performed is conducive to steady variation of the corresponding access speed, appropriate adjustment of the access speed, and improvement of user experience at the user end, for example, reduction or prevention of delays or jerks which may otherwise happen to video data displayed at the user end.

The present disclosure is disclosed above by preferred embodiments. However, persons skilled in the art should understand that the preferred embodiments are illustrative of the present disclosure only, but shall not be interpreted as restrictive of the scope of the present disclosure. Hence, all equivalent modifications and replacements made to the aforesaid embodiments shall fall within the scope of the present disclosure. Accordingly, the legal protection for the present disclosure shall be defined by the appended claims.

What is claimed is:

1. A memory access speed adjustment method, for use in controlling a controller of a memory, comprising the steps of:
    obtaining a current temperature value of the memory;
    determining an access speed threshold of the memory according to a continuous variation relation with respect to a difference between the current temperature value and a target temperature value; and
    adjusting, by the controller, an access speed of the memory according to the access speed threshold.

2. The memory access speed adjustment method of claim 1, further comprising:
    determining that an absolute value of the difference between the current temperature value and the target temperature value is greater than or equal to an allowable temperature variation,
    wherein the step of determining the access speed threshold of the memory is performed in response to that the absolute value of the difference is greater than or equal to the allowable temperature variation.

3. The memory access speed adjustment method of claim 1, further comprising:
    determining that the current temperature value is greater than or equal to a start temperature value,
    wherein the step of determining the access speed threshold of the memory is performed in response to that the current temperature value is greater than or equal to the start temperature value.

4. The memory access speed adjustment method of claim 1, further comprising:
    determining that the current temperature value is greater than or equal to a start temperature value; and
    determining that an absolute value of the difference between the current temperature value and the target temperature value is greater than or equal to an allowable temperature variation,
    wherein the step of determining the access speed threshold of the memory is performed in response to that the current temperature value is greater than or equal to the start temperature value and that the absolute value of the difference is greater than or equal to the allowable temperature variation.

5. The memory access speed adjustment method of claim 1, further comprising:
    determining that the current temperature value is greater than or equal to a start temperature value;
    determining that an absolute value of the difference between the current temperature value and the target temperature value is greater than or equal to an allowable temperature variation; and
    determining that the current temperature value falls within an operating temperature range,
    wherein the step of determining the access speed threshold of the memory is performed in response to that the current temperature value is greater than or equal to the start temperature value, that the absolute value of the difference is greater than or equal to the allowable temperature variation, and that the current temperature value falls within the operating temperature range.

6. The memory access speed adjustment method of claim 1, wherein the continuous variation relation is based on a linear function relation with respect to the difference between the current temperature value and the target temperature value.

7. The memory access speed adjustment method of claim 1, wherein the continuous variation relation is based on a first linear function relation with respect to the difference between the current temperature value and the target temperature value and a second linear function relation with respect to another difference between the current temperature value and a previously measured temperature value.

8. A control device for controlling an access speed of a memory, comprising:
    a controller; and
    a memory device for storing executable code to be read and executed by the controller, so as to perform a plurality of operations comprising:
        obtaining a current temperature value of the memory;
        determining an access speed threshold of the memory according to a continuous variation relation with respect to a difference between the current temperature value and a target temperature value; and
        adjusting the access speed of the memory according to the access speed threshold.

9. The control device of claim 8, wherein the operations further comprise:
    determining that an absolute value of the difference between the current temperature value and the target temperature value is greater than or equal to an allowable temperature variation,
    wherein the operation of determining the access speed threshold of the memory is performed in response to that absolute value of the difference is greater than or equal to the allowable temperature variation.

10. The control device of claim 8, wherein the operations further comprise:
    determining that the current temperature value is greater than or equal to a start temperature value,
    wherein the operation of determining the access speed threshold of the memory is performed in response to that the current temperature value is greater than or equal to the start temperature value.

11. The control device of claim 8, wherein the operations further comprise:
    determining that the current temperature value is greater than or equal to a start temperature value; and
    determining that an absolute value of the difference between the current temperature value and the target temperature value is greater than or equal to an allowable temperature variation,
    wherein the operation of determining the access speed threshold of the memory is performed in response to that the current temperature value is greater than or equal to the start temperature value and that the absolute value of the difference is greater than or equal to the allowable temperature variation.

12. The control device of claim 8, wherein the operations further comprise:
    determining that the current temperature value is greater than or equal to a start temperature value;
    determining that an absolute value of the difference between the current temperature value and the target temperature value is greater than or equal to an allowable temperature variation; and
    determining that the current temperature value falls within an operating temperature range,
    wherein the operation of determining the access speed threshold of the memory is performed in response to that the current temperature value is greater than or equal to the start temperature value, that the absolute value of the difference is greater than or equal to the allowable temperature variation, and that the current temperature value falls within the operating temperature range.

13. The control device of claim 8, wherein the continuous variation relation is based on a linear function relation with respect to the difference between the current temperature value and the target temperature value.

14. The control device of claim 8, wherein the continuous variation relation is based on a first linear function relation with respect to the difference between the current temperature value and the target temperature value and a second linear function relation with respect to another difference between the current temperature value and a previously measured temperature value.

15. A memory module, comprising:
a memory;
a temperature sensor for sensing a current temperature value of the memory;
a controller coupled to the memory and the temperature sensor and configured to control the memory; and
a memory device for storing executable code to be read and executed by the controller, so as to perform a plurality of operations comprising:
obtaining the current temperature value of the memory;
determining an access speed threshold of the memory according to a continuous variation relation with respect to a difference between the current temperature value and a target temperature value; and
adjusting the access speed of the memory according to the access speed threshold.

16. The memory module of claim 15, wherein the operations further comprise:
determining that an absolute value of the difference between the current temperature value and the target temperature value is greater than or equal to an allowable temperature variation,
wherein the operation of determining the access speed threshold of the memory is performed in response to that the absolute value of the difference is greater than or equal to the allowable temperature variation.

17. The memory module of claim 15, wherein the continuous variation relation is based on a linear function relation with respect to the difference between the current temperature value and the target temperature value.

18. The memory module of claim 15, wherein the access speed is an access speed between the controller and the memory.

* * * * *